United States Patent
Colyar

(10) Patent No.: US 9,738,839 B1
(45) Date of Patent: Aug. 22, 2017

(54) GENERATION EBULLATED-BED REACTOR SYSTEM

(71) Applicant: James J. Colyar, Newtown, PA (US)

(72) Inventor: James J. Colyar, Newtown, PA (US)

(73) Assignees: IFP ENERGIES NOUVELLES, Rueil-Malmaison (FR); AXENS, Rueil-Malmaison (FR)

( * ) Notice: Subject to any disclaimer, the term of this patent is extended or adjusted under 35 U.S.C. 154(b) by 0 days.

(21) Appl. No.: 15/142,159

(22) Filed: Apr. 29, 2016

(51) Int. Cl.
   *C10G 47/00* (2006.01)
   *B01J 16/00* (2006.01)

(52) U.S. Cl.
   CPC .......... *C10G 47/00* (2013.01); *B01J 16/005* (2013.01); *C10G 2300/1077* (2013.01); *C10G 2300/20* (2013.01)

(58) Field of Classification Search
   CPC ......... C10G 2300/1077; C10G 2300/20; B01J 16/005
   See application file for complete search history.

(56) References Cited

U.S. PATENT DOCUMENTS

| | | | |
|---|---|---|---|
| 4,857,168 A | 8/1989 | Kubo et al. | |
| 4,950,459 A * | 8/1990 | Buttke | B01J 8/20 208/143 |
| 5,925,238 A * | 7/1999 | Duddy | C10G 65/04 208/210 |
| 6,123,835 A | 9/2000 | Ackerson et al. | |
| 2013/0026068 A1 * | 1/2013 | Koseoglu | C10G 45/22 208/85 |

* cited by examiner

*Primary Examiner* — Brian McCaig

(57) ABSTRACT

This invention relates to the conversion or hydrotreatment of petroleum or coal derived liquids in a novel ebullated-bed reactor system. The novel processing scheme results in a much simpler and less costly (investment and annual operating) ebullated-bed reaction system through the elimination of the high pressure, high temperature separator, hydrogen purification plant, and recycle gas compressor as well as a smaller hydrogen make-up compressor all resulting in substantial operational and construction efficiency.

3 Claims, 1 Drawing Sheet

PROCESSING CONFIGURATION

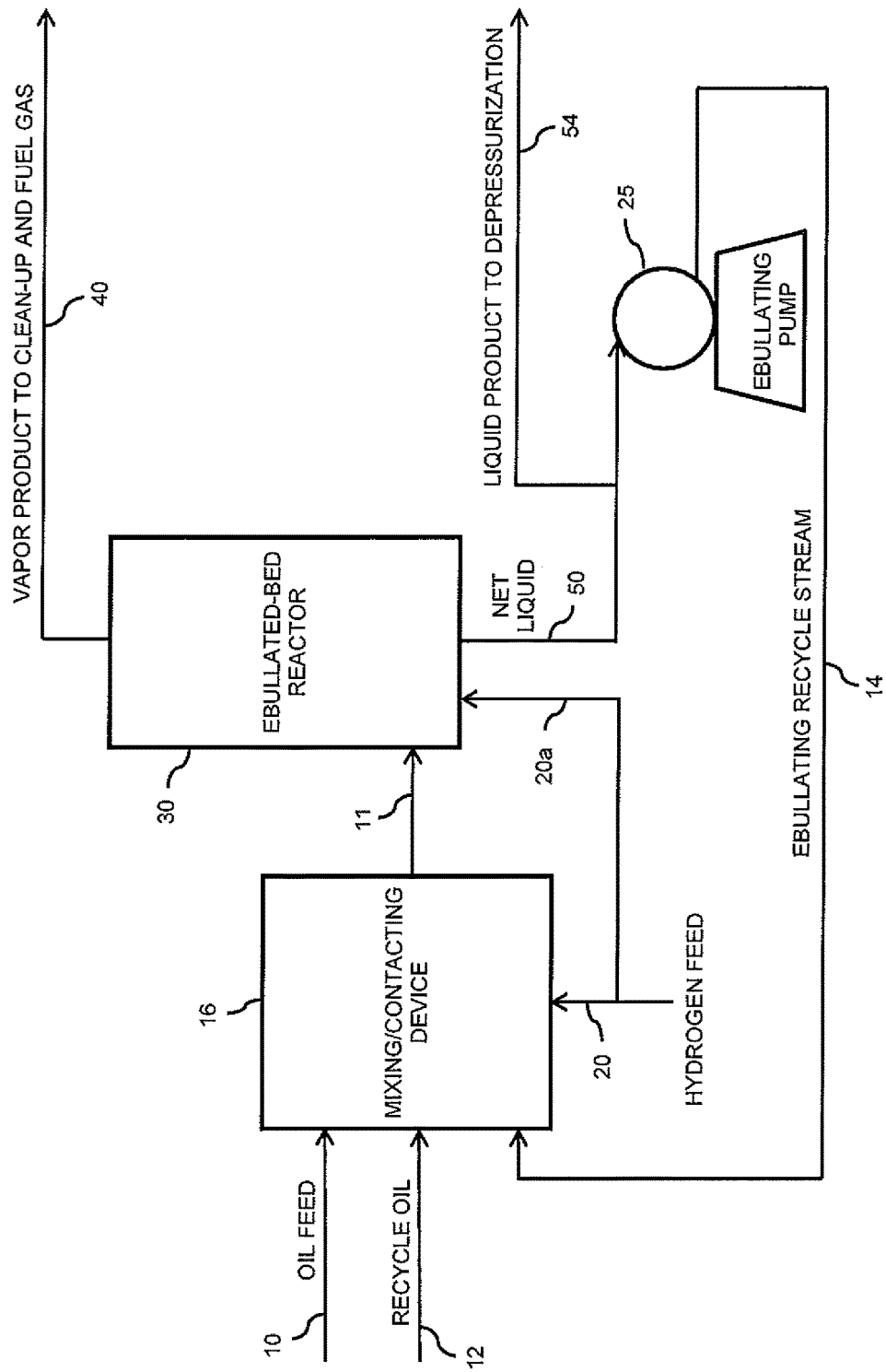

GENERATION EBULLATED-BED REACTOR SYSTEM

BACKGROUND OF THE INVENTION

This invention relates to the conversion and/or hydrotreatment of petroleum or coal derived liquids in an ebullated-bed reactor. The novel processing scheme results in a much simpler and less costly (initial investment and annual operating) ebullated-bed reaction system through the elimination of the high pressure, high temperature separator, hydrogen purification plant, and recycle gas compressor as well as a smaller hydrogen make-up compressor.

This efficiency is accomplished by insuring that the total liquid feed to the reactor (fresh oil feed, ebullating pump recycle and any downstream recycle liquid) is saturated with hydrogen prior to being fed to the reactor and that the quantity of hydrogen dissolved in the liquid is in excess of the quantity chemically consumed via reactions in the ebullated-bed reactor.

In general, ebullated-bed reactors are utilized to process heavy crude oil feed streams, particularly those feeds with high metals and CCR. The ebullated-bed process comprises the passing of concurrently flowing streams of liquids, or slurries of liquids and solids, and gas through a vertically elongated fluidized catalyst bed. The catalyst is fluidized and completely mixed by the upwardly flowing liquid streams. The ebullated-bed process has commercial application in the conversion and upgrading of heavy liquid hydrocarbons and converting coal to synthetic oils.

The ebullated-bed reactor and related process is generally described in U.S. Pat. No. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors, along with the liquid which is being hydrogenated, pass through the upper level of catalyst particles into a substantially catalyst free zone and are removed from the upper portion of the reactor. The catalyst is used for reacting hydrogen with a petroleum fraction, distillates or resids, for the purpose of saturating or removing sulfur, nitrogen, oxygen, metals or other contaminants, or for molecular weight reduction (cracking). Catalysts having special surface properties are required in order to provide the necessary activity to accomplish the desired reaction(s).

Ebullated-bed reactors are generally operated at relatively high temperatures and pressures in order to process these heavy feedstocks. Since such operating parameters substantially increase the cost of designing and constructing the reactors, it would therefore be advantageous to have a system wherein the overall design and manufacturing costs were optimized for specific feedstocks.

Present commercial ebullated-bed reactors operate with a nominal $1/32$ inch extrudate catalyst and at significant superficial gas velocities. The fluidization characteristic of such a system requires an ebullating recycle rate of 2-4 times the feedrate of the heavy oil in order to expand the reactor catalyst bed in the range of 30-50 percent of its settled bed level.

Additionally, the rate of high purity hydrogen containing gas feed to the ebullated-bed reactor is typically in the range of 3-5 times the stoichiometric hydrogen consumed by the feedstock. This relatively high gas feedrate is considered necessary to provide a product vapor phase hydrogen partial pressure of 1,000-2,000 psi (depending on feedstock and reactor severity). The high vapor hydrogen partial pressure insures that the vapor can provide the transfer of sufficient hydrogen to the liquid phase catalytic reacting system. The high rate of gas and the reactor vapor effluent containing significant unreacted hydrogen requires complex and expensive gas treating (separation, hydrogen recovery, recompression, etc.) equipment which can be a large fraction of the investment cost of an ebullated-bed reactor system.

Hence there is a need for an improved and simplified hydroprocessing method and apparatus.

SUMMARY OF THE INVENTION

The object of this invention is to provide a novel, new generation ebullated-bed reactor processing system design for treating petroleum residue, coal, heavy vacuum gas oil and deasphalted oil feeds.

It is another object of this invention to provide an ebullated-bed reactor wherein premixing of the reactor liquid feeds and hydrogen insures that the total liquid feed is saturated with hydrogen prior to being fed to the ebullated-bed reactor.

It is still a further object of this invention to provide an adequate supply of dissolved hydrogen requiring that the reactor and that the ebullated-bed reactor operate with an ebullation recycle ratio (based on fresh oil feedrate) in the range of 5 to 12. This will ensure that the total hydrogen dissolved is in excess of that consumed in the reactors.

It is yet a further object of the invention to eliminate many of the expensive equipment (hot, high pressure separator, HPU, recycle gas compressor) normally associated with ebullated-bed systems and to provide a smaller make-up hydrogen compressor.

It is another object of the invention utilize a larger size ebullated-bed extrudate catalyst (e.g. $1/16$ inch instead of $1/32$ inch) in order to increase the required oil plus gas velocity for given catalyst bed expansion level. The large size catalyst is necessary due to the high (5 to 12 times fresh feed) required ebullation liquid recycle rate.

It is yet another object of the invention to attain enhanced catalytic kinetics in the ebullated-bed reactor as a result of complete liquid phase hydrogen saturation at the catalyst site and removal of gas diffusion limitations in the reactor.

It is a further object of the invention to lower the design and operating pressure in the ebullated-bed reactor system thereby significantly reducing the required investment and operating cost of an ebullated-bed reaction system.

More specifically, the present invention describes an improved method for conversion and/or hydrotreatment of petroleum or coal-derived liquids in an ebullated-bed reactor wherein the improvement comprises the complete saturation of the total liquid feedstream with hydrogen prior to feeding to said ebullated-bed reactor and wherein said ebullated-bed reactor contains a extrudate catalyst of at least one-sixteenth of one inch in diameter. Additionally, the present invention describes a process for the conversion or hydrotreatment of petroleum or coal-derived liquids comprising:

a) feeding one or more liquid hydrocarbon feedstreams and a hydrogen feedstream to a mixing vessel or apparatus wherein said one or more liquid hydrocarbon feedstreams are fully-saturated with hydrogen within said mixing vessel or apparatus and resulting in a mixture that is primarily liquid phase with a small amount of undissolved vaporous hydrogen;

b) processing said mixture that is primarily liquid phase from said mixing vessel or apparatus in an ebullated-bed reactor for conversion, hydrotreatment, and consumption of said undissolved vaporous hydrogen to below the saturation level resulting in a vapor products stream and a liquid products;
c) routing said vapor products stream for further processing and recovery of liquids and fuel gas;
d) routing of a portion of said liquid products stream to an ebullating pump to create an ebullating recycle stream;
e) sending a separate portion of said liquid products stream for depressurization and further separation into final liquid and gas products; and
wherein said ebullating recycle stream from step d) is one of said hydrocarbon feedstreams from step a).

BRIEF DESCRIPTION OF THE DRAWINGS

This invention will be described further with reference to the following drawing in which FIG. 1 is a schematic flowsheet of an integrated process with the novel features of the invention described therein.

DETAILED DESCRIPTION OF THE DRAWINGS

FIG. 1 is a detailed schematic flowsheet of the invention. A fresh oil feedstream 10, an optional recycled oil feedstream (e.g. vacuum gas oil or bottoms recycle) 12 and an ebullated-bed recycle oil feedstream 14 are mixed with a hydrogen stream 20 in a simple mixing/contacting vessel/device or apparatus 16. The purpose of this vessel or apparatus 16 is to insure that the hydrogen 20 is dissolved in the liquids at the approximate operating pressure of the reaction system. The mixture 11 from the simple mixing/contacting vessel/device 16 is thereafter fed to the ebullated-bed 30 reactor along with a small hydrogen stream 20a which is added in the case of higher than anticipated chemical hydrogen consumption. In the ebullated-bed reactor 30, the hydrogen 20a readily reacts with the mixture 11 containing the fresh oil feedstream 10, an optional recycled oil feedstream (e.g. vacuum bottoms recycle) 12 and an ebullated-bed recycle oil feedstream 14 using an extrudate type catalyst (not shown).

In the reactor, available gaseous hydrogen can be dissolved in the reactor liquid as the hydrogen concentration falls below the saturation level. The net vapor product 40 from the reactor will contain a low concentration of hydrogen and can be treated downstream to remove acid gases and eventually be routed to LPG and fuel gas recovery (not shown). The net liquid product 50 is thereafter sent to either to an ebullating pump suction device 25 or sent directly to depressurization 54 (i.e., no hot, high pressure separator). Since there is a lower rate of hydrogen feed to the reactor, the make-up compressor will be smaller than a typical compressor used in residue hydrocracking. With no gas recycle there is no HPU (hydrogen purification unit) or recycle gas compressor.

The basis for the quantity of ebullated-bed recycle liquid feedstream 14 rate can be estimated from published hydrogen solubility values. Based on) Cai, H. Y., Shaw, J. M. and Chung, K H., "Hydrogen Solubility Measurements in Heavy Oil and Bitumen Cuts", FUEL, Vol. 80, 2001, p 1055-1063. Available at http://www.uofaweb.ualberta.ca/jmshaw/pdfs/2001Hydrogensolubilitymeasurementsinheavyoilsandbitumencuts.pdf, the solubility coefficient of typical ebullated-bed feed/recycle is approximately 0.08 g-mole/Kg-MPa at typical residue feedstock reactor temperature and pressure.

At typical chemical hydrogen consumptions, Table 1 below illustrates the quantity of total reactor liquid feed and ebullating recycle required for both distillate and residue ebullated-bed applications.

TABLE 1

| Hydrogen Consumption | Distillate | Residue |
|---|---|---|
| SCF/Bbl | 1,000 | 1,650 |
| W % | 1.62 | 2.51 |
| g-mole/Kg | 8.0 | 12.4 |
| Pressure, MPa | 10 | 17 |
| Solubility, g-mole/Kg | 1.0 | 1.36 |
| Required Liquid Feed, Kg/Kg Feed | 8.0 | 9.2 |
| Ebullating Recycle Kg/Kg Fresh Liquid Feed | 7.0 | 8.2 |

Importantly, the required ebullating pump recycle 14 is in the range of 7 to 8 times the fresh oil feedrate. This is in stark contrast to the 2-3 ratio that is currently evident in state-of-the-art commercial applications.

To accommodate this higher recycle rate the size of the extrudate catalyst can be increased (doubled). This larger catalyst size plus a lower gas velocity in the reactor will double the current ebullating rate requirements (from feed plus recycle of 3.5 to 7.0) resulting in an operation which will provide the required hydrogen. A slightly lower reactor L/D (length to diameter ratio) may also be required.

There is also a potential to lower the reactor operating pressure from the current value of approximately 2,600 psi (residue feed application). Currently the hydrogen outlet partial pressure in the ebullated-bed reactor is approximately 1,900 psi and this is deemed sufficient for stable operation. With the premixing of liquid feeds and hydrogen (~100%), the total system pressure could presumably be just above the 1,900 psi level and have the same net saturation content of hydrogen.

This invention will be further described by the following example, which should not be construed as limiting the scope of the invention.

Example 1

A 25,000 BPD ebullated-bed facility for hydrocracking a Western Canadian heavy oil is examined to illustrate the large technical and economic potential for the subject invention.

The important base information for the facility is shown in Table 2 below:

TABLE 2

| Feed: | Western Canadian Heavy Oil |
|---|---|
| Feedrate: | 25,000 BPSD |
| Vacuum Residue Conversion Level: | 65 W % |
| Chemical Hydrogen Consumption: | 1,170 SCF/Bbl |

The important information includes a feedrate of 25,000 barrels per stream day (BPSD) of an Western Canadian Heavy oil and a chemical hydrogen consumption of 1,170 standard cubic feet per barrel of feed (SCF/Bbl), equivalent to 1.7 w % of the feed.

The design and investment/operation cost for this ebullated-bed hydrocracking facility was developed for both a pre-invention and invention cases. It is noted that the operating conditions for the invention case were adjusted so that the net yields of liquid and gas products and product qualities were identical to the pre-invention case.

The investment and operating cost for both cases were developed to determine the potential advantage of the invention. A summary of the cost differential is shown in Table 3 below:

TABLE 3

|  | Investment, $ MM US (2015) | % Total Pre-Invention Cost |
|---|---|---|
| Reactor | −9.8 |  |
| Mixing Vessel Apparatus | +1.0 |  |
| Larger Ebullating Pump | +2.0 |  |
| Hot High Pressure Separation | −1.8 |  |
| Other Drums/Exchangers | −0.3 |  |
| Hydrogen Purification Unit and Gas Purification | −12.6 |  |
| Net | −21.5 | 7-10 |
| Operating Cost, $ MM/Year (2015) |  | % Total Investment Cost |
| Fired Fuel | −0.5 |  |
| Power- Pumps/Compressor | 0.4 |  |
| Hydrogen | −0.7 |  |
| Net | −1.6 | 5 |

The example results indicate that the invention will result in an investment savings of approximately 7-10 percent and an annual operating cost savings of 5 percent relative to the pre-invention case. Given that high-pressure residue hydrocracking is capital intensive, these results will significantly impact the profitability of future hydrocracking projects.

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

I claim:

1. A process for the conversion or hydrotreatment of petroleum or coal-derived liquids comprising:
    a) feeding one or more liquid hydrocarbon feedstreams and a hydrogen feedstream to a mixing vessel or apparatus wherein said one or more liquid hydrocarbon feedstreams are fully-saturated with hydrogen within said mixing vessel or apparatus and resulting in a mixture that is greater than 90 weight percent liquid phase with the remaining amount undissolved vaporous hydrogen;
    b) directly processing said mixture that is greater than 90 weight percent liquid phase from said mixing vessel or apparatus in an ebullated-bed reactor for conversion, hydrotreatment, and consumption of hydrogen resulting in a vapor products stream and a liquid products stream;
    c) routing said vapor products stream for further processing and recovery of liquids and fuel gas;
    d) routing of a portion of said liquid products stream to an ebullating pump to create an ebullating recycle stream;
    e) sending a separate portion of said liquid products stream for depressurization and further separation into final liquid and gas products; and
    wherein said ebullating recycle stream from step d) is one of said hydrocarbon feedstreams from step a).

2. The process of claim 1 wherein said ebullated-bed reactor in step b) contains an extrudate catalyst of at least one-sixteenth of one inch in diameter.

3. The process of claim 1 wherein said ebullated-bed reactor in step b) operates with an ebullation recycle ratio of between 5 to 12.

* * * * *

UNITED STATES PATENT AND TRADEMARK OFFICE
CERTIFICATE OF CORRECTION

| | | |
|---|---|---|
| PATENT NO. | : 9,738,839 B1 | Page 1 of 1 |
| APPLICATION NO. | : 15/142159 | |
| DATED | : August 22, 2017 | |
| INVENTOR(S) | : James J. Colyar | |

It is certified that error appears in the above-identified patent and that said Letters Patent is hereby corrected as shown below:

On the Title Page

The title is incorrectly listed as "GENERATION EBULLATED-BED REACTOR SYSTEM" and it should be "NEW GENERATION EBULLATED-BED REACTOR SYSTEM".

Signed and Sealed this
Tenth Day of October, 2017

Joseph Matal
*Performing the Functions and Duties of the*
*Under Secretary of Commerce for Intellectual Property and*
*Director of the United States Patent and Trademark Office*